UNITED STATES PATENT OFFICE.

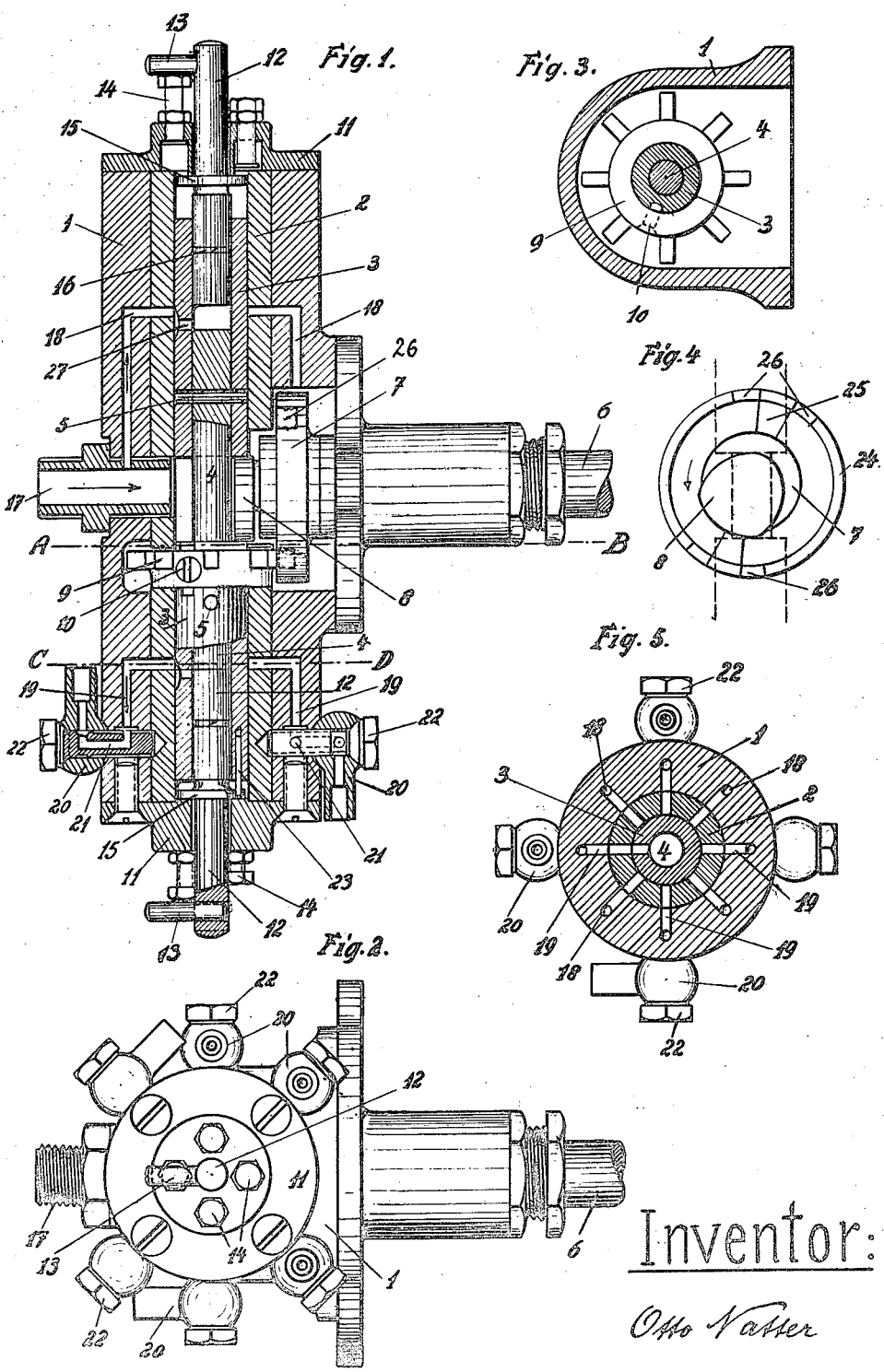

OTTO NATTER, OF CANNSTATT, GERMANY.

LUBRICATING PUMP.

1,413,052.  Specification of Letters Patent.  Patented Apr. 18, 1922.

Application filed August 25, 1920. Serial No. 406,031.

*To all whom it may concern:*

Be it known that I, OTTO NATTER, of Cannstatt, Wurttemberg, Germany, a citizen of the German Republic, have invented certain new and useful Improvements in Lubricating Pumps, of which the following is a specification.

The object of this invention is to provide an improved lubricating pump for delivering oil to a plurality of lubricating pipes or conduits connected to different parts of a machine or apparatus, the delivery to each being effected by a separate stroke of the pump.

To this end I use a piston which performs alternately a reciprocating and a rotary movement, the suction and delivery being effected by the reciprocating movement, but the direction of the delivery depending on the position to which the piston has been rotated.

The invention is illustrated in the accompanying drawing, showing an embodiment thereof in which the pump is double-acting.

Fig. 1 is a vertical section of the pump.

Fig. 2 is a plan view thereof.

Fig. 3 is a section on the line A—B of Fig. 1, with parts removed.

Fig. 4 a side view of part of the actuating mechanism, and

Fig. 5 a section on the line C—D of Fig. 1.

The pump shown has an aluminium cylinder 1, with two cast liners 2 therein, and two pistons 3. These pistons consist of two tubular members or sleeves, spaced axially apart, and a rod 4 which is common to them both and extends about half way through each sleeve, the sleeves being made fast to the rod by pins 5. The pistons, which are rotatable and axially movable, are actuated by a shaft 6 having at one end a tappet wheel 7 and a cam 8. A cog-wheel 9 actuated by the tappet wheel 7 is mounted on one of the pistons 3, and is engaged therewith by a pin 10 entering a slot, so that the wheel can slide axially on the piston but can also rotate the same. The tappet wheel 7 has a flange 24, and within this flange two tappets 25. At the sides of each tappet the flange 24 has two slots 26 enabling the cogs of the wheel 7 to pass in and out. The casing 1 has covers 11, in each of which there is guided a small plunger 12. These plungers 12 work in the hollow pistons 3. Each plunger 12 has outside the cover 11 a lateral projection 13, and its inward movement is limited or wholly prevented by one or other of four adjustable abutments 14 on the cover, placed in the path of the projection 13. Inside the cover but outside the piston 3 the plunger 12 has a collar 15, and inside the piston 3 it has a tight piston ring 16. A pin 23 projects from the collar 15 into a long bore in the piston 3, so that the plunger 12 can move axially, but rotates with the piston 3.

An oil supply pipe 17 is connected to the casing 1 between the pistons 3, and admits oil to the chamber around the rod 4 and other parts inside the case. Oil ducts 18 in the wall of the casing and liner 2 lead from this oil chamber to the sides of the pistons 3, and each of the latter has a port 27 disposed close to the end of the rod 4, with a wide mouth arranged to face one or other of the ducts 18, of which there are four disposed equidistant around the piston. Between the ducts 18, which are suction ducts, there are delivery ducts 19, arranged so that the port 27 can also face either of them. Each of the ducts 19 leads to a delivery pipe 20 having a spherical head, through which passes a screw 22 having a duct 21 therein for communication with the duct 19. When the screw 22 is loose the pipe 20 can be rotated thereon, to set it at a selected angle convenient for connection to the part to be lubricated, and by tightening up the screw the pipe is fixed at this angle.

Rotation of the shaft 6 causes the cam 8 to reciprocate the pistons, with a period of rest at the end of each stroke, and during the periods of rest the tappet wheel 7 rotates the pistons by means of the cog wheel 9. Rotation of the wheel 7 during the reciprocating movements of the pistons 3 is prevented by the flange 24 of the tappet wheel, as two cogs of the wheel 7 then rest against the flange. At the end of each stroke a tappet 25 strikes another of the cogs, and one of the slots or gaps 26 is then in position to allow the wheel 9 to rotate.

The rotation of the pistons 3 places each port 27 alternately opposite a duct 18 and a duct 19. Fig. 1 shows the port of the upper piston opposite a duct 18, and the port of the lower piston opposite a duct 19. The upper piston 3 has completed a suction stroke, whereby the face of the rod 4 therein has been retracted from the face of the plunger 12, the space between the faces being filled with oil. With the arm 13 of the plunger 12 resting on a fully extended abutment 14 as shown, no inward movement of the plunger is possible. If, however, this abutment were screwed down more or less, the plunger would be free to move inwards till the arm 13 strikes the abutment 14, and it would so move by reason of the suctional effect, and the friction of the ring 16. Less oil, or none at all, would consequently be sucked in during this suction stroke. After the suction stroke the piston is rotated by the wheels 7 and 9, to place the port 27 opposite a delivery duct 19, and a delivery stroke then follows, expelling the oil to the pipe 20 connected to that duct 19, whereupon the piston is rotated to place the port 27 opposite the next duct 18. The plunger 12 is also rotated, so that at the next suction stroke the arm 13 is over another abutment 14, the adjustment of which may differ from that of the one previously in use, so that different quantities of oil can, if desired, be pumped through the several pipes 20. If the plunger 12 is drawn inwards during a suction stroke, it is expelled again during the delivery stroke till the collar 15 strikes the cover 11, so that the arm 13 will always be returned to its extreme outer position. During the delivery strokes the arm 13 is midway between two abutments 14.

An indefinite number of ducts 18 and 19 can be provided, given suitable dimensions of the pump, and a plurality of sources of supply may be used for the several ducts, so that different kinds of oil may be delivered to different parts, or circulating oil may be used for some parts, and fresh oil for others.

What I claim as my invention and desire to secure by Letters Patent of the United States is:—

1. In a lubricating pump the combination of a cylinder having a plurality of suction ducts and delivery ducts, alternating with each other and disposed at intervals about its circumference, a rotatable and axially movable piston in said cylinder, said piston being in part tubular and having a port in the tubular part, arranged to face said ducts successively in the course of rotation, means for reciprocating said piston with a period of rest at the end of each stroke, a cog-wheel on said piston, means engaging said wheel with said piston allowing the piston to slide axially in the wheel but causing it to rotate with the wheel, and a tappet wheel having tappets for intermittently rotating said cog wheel, said tappet wheel having also a flange with gaps therein, which forms an abutment for the cogs during the intervals between the rotating movements of the cog wheel, the said gaps allowing the cog wheel to rotate when it is actuated by the tappets.

2. In a lubricating pump the combination of a cylinder having a plurality of suction ducts and delivery ducts, alternating with each other and disposed at intervals about its circumference, a rotatable and axially movable piston in said cylinder, said piston being in part tubular with a port in the tubular part arranged to face said ducts successively in the course of rotation, means for reciprocating said piston, means for rotating said piston, a plunger fitting into the tubular part of said piston, frictionally engaged therewith but slidable to and from the port in said tubular part, and adjustable means limiting the movement which said plunger can make in frictional engagement with the piston during the suction stroke of the latter.

3. In a lubricating pump the combination of a cylinder having a plurality of suction ducts and delivery ducts, alternating with each other and disposed at intervals about its circumference, a rotatable and axially movable piston in said cylinder, said piston being in part tubular with a port in the tubular part arranged to face said ducts successively in the course of rotation, means for reciprocating said piston, means for rotating said piston, a plunger fitting into the tubular part of said piston, frictionally engaged therewith but slidable to and from the port in said tubular part, means causing said plunger to rotate with the piston, an arm carried by said plunger outside the tubular piston part, and a series of separately adjustable abutments severally disposed in the paths traversed by said arm during successive suction strokes of the piston, said abutments limiting the movement which said plunger can perform with the piston during said suction strokes.

In witness whereof I have signed this specification in the presence of two witnesses.

OTTO NATTER.

Witnesses:
JOHANN OHMSBEDE,
ANNA AHRENS.